(12) United States Patent
Lomasney et al.

(10) Patent No.: US 10,513,791 B2
(45) Date of Patent: Dec. 24, 2019

(54) NANOLAMINATE COATINGS

(71) Applicant: Modumetal, Inc., Seattle, WA (US)

(72) Inventors: Patrick Lomasney, Seattle, WA (US); Christina A. Lomasney, Seattle, WA (US)

(73) Assignee: MODUMENTAL, INC., Seattle, WA (US)

(*) Notice: Subject to any disclaimer, the term of this patent is extended or adjusted under 35 U.S.C. 154(b) by 236 days.

(21) Appl. No.: 14/855,088

(22) Filed: Sep. 15, 2015

(65) Prior Publication Data

US 2016/0002806 A1    Jan. 7, 2016

Related U.S. Application Data

(63) Continuation of application No. PCT/US2014/031096, filed on Mar. 18, 2014.
(Continued)

(51) Int. Cl.
| | |
|---|---|
| *C25D 5/14* | (2006.01) |
| *C25D 3/56* | (2006.01) |
| *C25D 5/18* | (2006.01) |
| *C25D 7/04* | (2006.01) |
| *C25D 21/02* | (2006.01) |
| *C25D 21/12* | (2006.01) |
| *C25D 21/14* | (2006.01) |
| *F16L 9/02* | (2006.01) |

(Continued)

(52) U.S. Cl.
CPC ............ *C25D 5/14* (2013.01); *C25D 3/562* (2013.01); *C25D 5/18* (2013.01); *C25D 7/04* (2013.01); *C25D 21/02* (2013.01); *C25D 21/12* (2013.01); *C25D 21/14* (2013.01); *F16L 9/02* (2013.01); *F16L 9/14* (2013.01); *C23C 18/1653* (2013.01); *C23C 18/2086* (2013.01); *C23C 18/285* (2013.01); *C23C 18/30* (2013.01)

(58) Field of Classification Search
CPC ....................................... F16L 9/02; F16L 9/14
USPC .................... 138/146, 145, 137, DIG. 6, 143
See application file for complete search history.

(56) References Cited

U.S. PATENT DOCUMENTS

| | | |
|---|---|---|
| 2,428,033 A | 9/1947 | Nachtman |
| 3,090,733 A | 5/1963 | Brown |

(Continued)

FOREIGN PATENT DOCUMENTS

| | | |
|---|---|---|
| CN | 1380446 A | 11/2002 |
| CN | 1924110 A | 3/2007 |

(Continued)

OTHER PUBLICATIONS

"Corrosion resistance and microstructure of electrodeposited nickel-cobalt alloy coatings", Surface and Coatings Technology; vol. 201, Issue 6, Dec. 4, 2006, pp. 3051-3060, by Srivastava, Meenu; Selvi, V. Ezhil; Grips, V.K. William; Rajam, K.S.*

(Continued)

*Primary Examiner* — Craig M Schneider
*Assistant Examiner* — David R Deal
(74) *Attorney, Agent, or Firm* — Seed Intellectual Property Law Group LLP

(57) ABSTRACT

This disclosure includes coatings for increasing the physical and/or chemical properties of articles, for example, tubular metal articles such as those found in the oil and gas industry, as well as processes for making such coatings and articles comprising such coatings.

19 Claims, 3 Drawing Sheets

Related U.S. Application Data

(60) Provisional application No. 61/802,301, filed on Mar. 15, 2013.

(51) Int. Cl.
*F16L 9/14* (2006.01)
*C23C 18/16* (2006.01)
*C23C 18/20* (2006.01)
*C23C 18/28* (2006.01)
*C23C 18/30* (2006.01)

(56) References Cited

U.S. PATENT DOCUMENTS

| | | |
|---|---|---|
| 3,255,781 A | 6/1966 | Gillespie, Jr. |
| 3,282,810 A | 11/1966 | Odekerken |
| 3,362,851 A | 1/1968 | Dunster |
| 3,716,464 A | 2/1973 | Kovac et al. |
| 3,866,289 A | 2/1975 | Brown et al. |
| 3,994,694 A | 11/1976 | Clauss et al. |
| 3,996,114 A | 12/1976 | Ehrsam |
| 4,191,617 A | 3/1980 | Hurley et al. |
| 4,216,272 A | 8/1980 | Clauss |
| 4,314,893 A | 2/1982 | Clauss |
| 4,461,680 A | 7/1984 | Lashmore |
| 4,510,209 A | 4/1985 | Hada et al. |
| 4,540,472 A | 9/1985 | Johnson et al. |
| 4,543,300 A | 9/1985 | Hara et al. |
| 4,652,348 A | 3/1987 | Yahalom et al. |
| 4,678,552 A | 7/1987 | Chen |
| 4,678,721 A | 7/1987 | den Broeder et al. |
| 4,869,971 A | 9/1989 | Nee et al. |
| 4,885,215 A | 12/1989 | Yoshioka et al. |
| 4,904,542 A | 2/1990 | Mroczkowski |
| 4,975,337 A | 12/1990 | Hyner et al. |
| 5,043,230 A | 8/1991 | Jagannathan et al. |
| 5,268,235 A | 12/1993 | Lashmore et al. |
| 5,489,488 A | 2/1996 | Asai et al. |
| 6,143,430 A | 11/2000 | Miyasaka et al. |
| 6,344,123 B1 | 2/2002 | Bhatnagar |
| 6,468,672 B1 | 10/2002 | Donovan, III et al. |
| 8,152,985 B2 | 4/2012 | Macary |
| 9,005,420 B2 | 4/2015 | Tomantschger et al. |
| 9,080,692 B2 | 7/2015 | Tomomori et al. |
| 2002/0070118 A1 | 6/2002 | Schreiber et al. |
| 2003/0234181 A1* | 12/2003 | Palumbo ............ C25D 5/02 205/115 |
| 2004/0031691 A1 | 2/2004 | Kelly et al. |
| 2004/0211672 A1 | 10/2004 | Ishigami et al. |
| 2005/0109433 A1 | 5/2005 | Danger et al. |
| 2006/0243597 A1 | 11/2006 | Matefi-Tempfli et al. |
| 2006/0272949 A1 | 12/2006 | Detor |
| 2009/0130425 A1 | 5/2009 | Whitaker |
| 2010/0187117 A1 | 7/2010 | Lingenfelter et al. |
| 2010/0304063 A1* | 12/2010 | McCrea ............... C08J 7/04 428/35.8 |
| 2012/0088118 A1* | 4/2012 | Lomasney ............ C25D 5/10 428/615 |
| 2016/0002803 A1 | 1/2016 | Sklar |
| 2016/0002806 A1 | 1/2016 | Lomasney et al. |
| 2017/0191179 A1 | 7/2017 | Sklar |

FOREIGN PATENT DOCUMENTS

| | | |
|---|---|---|
| CN | 101113527 A | 1/2008 |
| CN | 101195924 A | 6/2008 |
| GB | 2 324 813 A | 11/1998 |
| JP | 58-197292 A | 11/1983 |
| SU | 36121 A1 | 4/1935 |
| SU | 882417 A3 | 11/1981 |
| WO | 97/00980 A1 | 1/1997 |
| WO | 2009/045433 A1 | 4/2009 |
| WO | 2009/079745 A1 | 7/2009 |
| WO | 2011/033775 A1 | 3/2011 |

OTHER PUBLICATIONS

International Search Report and Written Opinion, International Application No. PCT/US2014/031096 (published as WO 2014/146114) (dated Aug. 19, 2014).

"Improvement of Galvanneal Coating Adherence on Advanced High Strength Steel," Appendix 1: Literature review (Task 1), Progress Report No. 1 to Galvanized Autobody Partnership Program of International Zinc Association, Brussels, Belgium, Jun. 2008-Jul. 2009, 70 pages, Issued: Sep. 2009.

Blum, "The Structure and Properties of Alternately Electrodeposited Metals," paper presented at the Fortieth General Meeting of the American Electrochemical Society, Lake Placid, New York, 14 pages (Oct. 1, 1921).

Designing with Metals—Power Manufacturing, http://www.pwrmfg.com/power-manufacturing/technical-info/designing-with-metals/, printed Oct. 5, 2017 (2017), 3 pages.

Etminanfar, M.R., et al., "Corrosion resistance of multilayer coatings of nanolayered Cr/Ni electrodeposited from Cr(III)—Ni(II) bath," Thin Solid Films, 520:5322-5327 (2012).

Georgescu et al., "Magnetic Behavior of [Ni/Co—Ni—Mg—N] x n Cylindrical Multilayers prepared by Magnetoelectrolysis," Phys. Stat. Sol. (a) 189, No. 3, 1051-1055 (2002).

Huang et al., "Characterization of Cr—Ni multilayers electroplated from a chromium(III)-nickel(II) bath using pulse current," Scripta Materialia, 57:61-64 (2007).

Huang et al., "Hardness variation and annealing behavior of a Cr—Ni multilayer electroplated in a trivalent chromium-based bath," Surface and Coatings Technology, 203, 3320-3324 (2009).

Ivanov et al., "Corrosion resistance of compositionally modulated multilayered Zn—Ni alloys deposited from a single bath," Journal of Applied Electrochemistry, 33:239-244 (2003).

Kalu et al., "Cyclic voltammetric studies of the effects of time and temperature on the capacitance of electrochemically deposited nickel hydroxide," Journal of Power Sources, 92:163-167 (2001).

Kirilova et al., "Corrosion behaviour of Zn—Co compositionally modulated multilayers electrodeposited from single and dual baths," Journal of Applied Electrochemistry, 29:1133-1137 (1999).

Onoda et al., "Preparation of amorphous/crystalloid soft magnetic multilayer Ni—Co—B alloy films by electrodeposition," Journal of Magnetism and Magnetic Materials, 126(1-3):595-598 (Sep. 1, 1993).

Ross, "Electrodeposited Multilayer Thin Films," Annual Review of Materials Science, 24:159-188 (1994).

Rousseau et al., "Single-bath Electrodeposition of Chromium-Nickel Compositionally Modulated Multilayers (CMM) From a Trivalent Chromium Bath," Plating and Surface Finishing, pp. 106-110 (Sep. 1999).

Tench et al., "Considerations in Electrodeposition of Compositionally Modulated Alloys," J. Electrochem. Soc., vol. 137, No. 10, 3061-3066, (Oct. 1990).

Thangaraj et al., "Corrosion behaviour of composition modulated multilayer Zn—Co electrodeposits produced using a single-bath technique," Journal of Applied Electrochemistry, 39:339-345 (Oct. 21, 2008).

Thangaraj et al., "Surface Modification by Compositionally Modulated Multilayered Zn—Fe Alloy Coatings," Chinese Journal of Chemistry, 26:2285-2291 (2008).

Tokarz et al., "Preparation, structural and mechanical properties of electrodeposited Co/Cu multilayers," Physica Status Solidi, 11:3526-3529 (Jun. 18, 2008).

Weil et al., "Properties of Composite Electrodeposits," Final Report, Contract No. DAAL03-87-K-0047, U.S. Army Research Office, 21 pages (Jan. 1, 1990).

Wilcox, "Surface Modification With Compositionally Modulated Multilayer Coatings," The Journal of Corrosion Science and Engineering, 6, Paper 52, 5 pages (submitted Jul. 6, 2003; fully published Jul. 26, 2004).

* cited by examiner

NANOLAMINATE COATINGS

CROSS-REFERENCE TO RELATED APPLICATIONS

This application is a continuation of International Application No. PCT/US2014/031096, filed Mar. 18, 2014, which claims the benefit of U.S. Provisional Patent Application No. 61/802,301, filed Mar. 15, 2013, each of which applications is incorporated herein by reference in its entirety.

FIELD

This disclosure includes coatings for increasing the physical and/or chemical properties of articles, for example, tubular metal articles such as those found in the oil and gas industry, as well as processes for making such coatings and articles comprising such coatings.

SUMMARY

This disclosure describes coatings comprising nanolaminates that may be applied to articles, including steels and polymeric substrates for example, to improve their physical and/or chemical properties. Processes for making such coatings and articles comprising such coatings are also disclosed. Embodiments of this disclosure include tubular articles comprising such coatings, for example, tubular materials used in the oil and gas industry such as casings, drill pipes and the like.

FIGURES

DESCRIPTION

1.0 Overview

Figure 1:
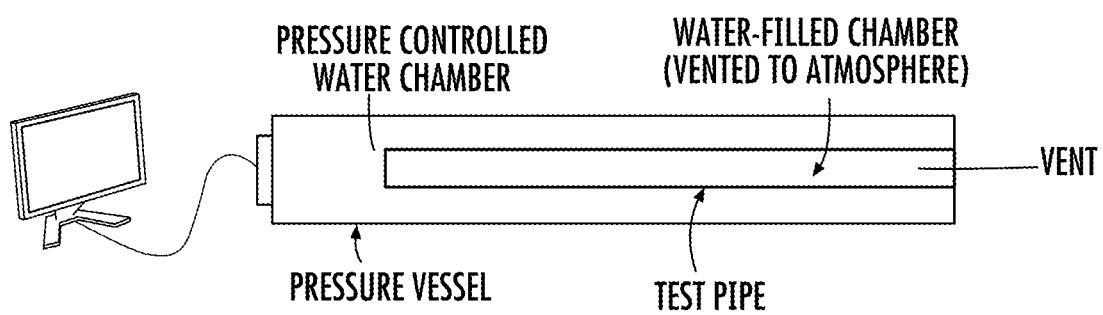
FIG. 1 illustrates a schematic of a testing apparatus used for collapse pressure measurement.
Figure 2:
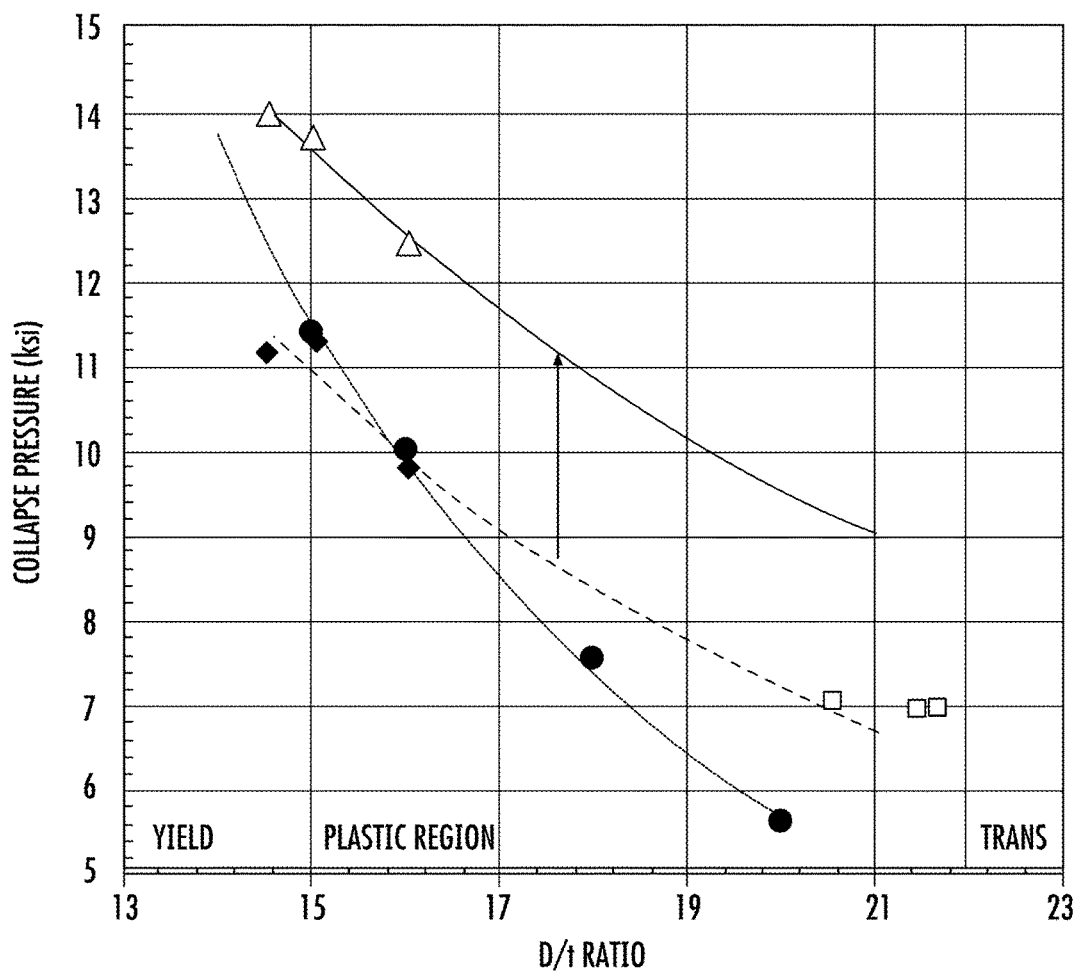
FIG. 2 is a plot of collapse performance for steel alloy pipe and nickel-cobalt nanolaminate coated steel pipe at various Diameter/wall Thickness (D/T) ratios versus their collapse pressures along with Blade Calculated values.
Figure 3:
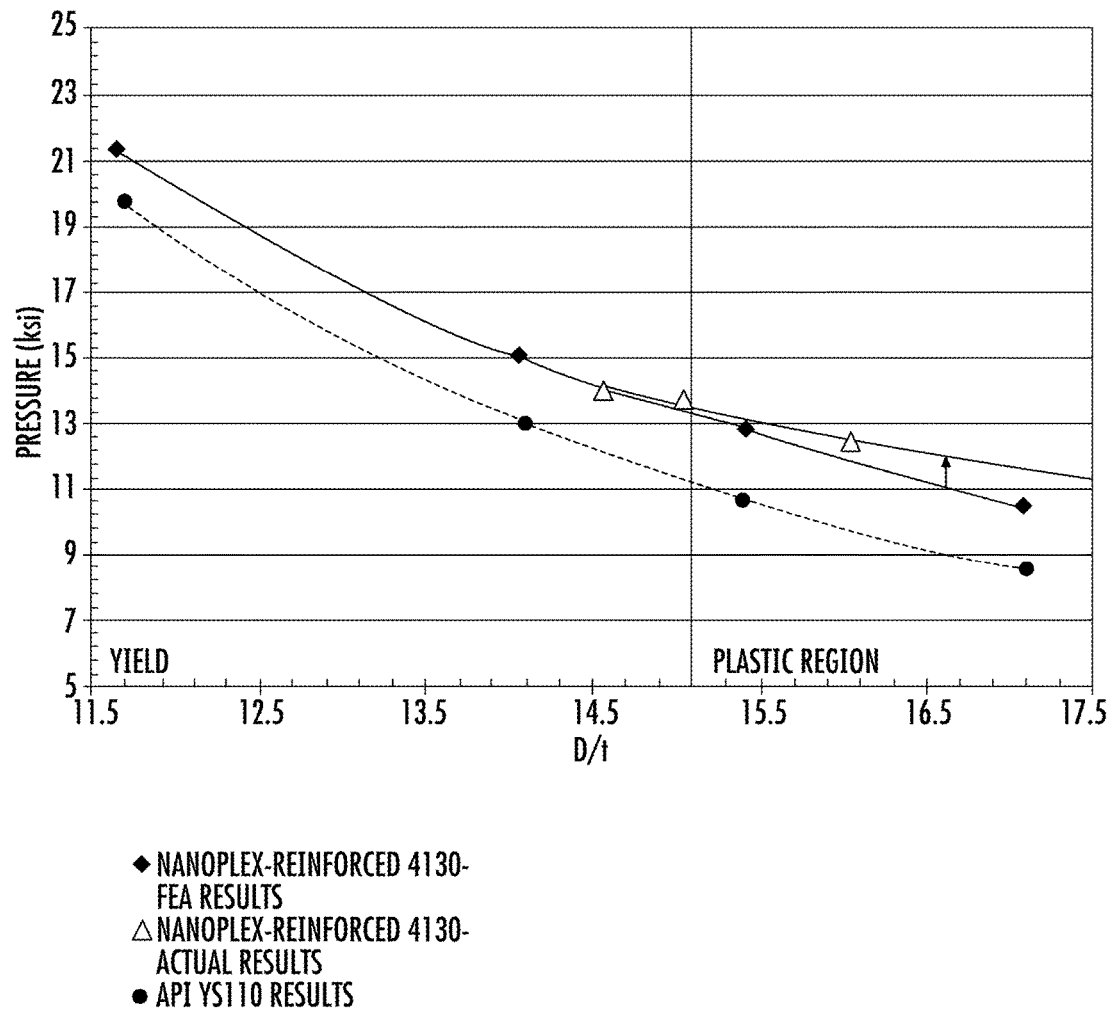
FIG. 3 is a plot of collapse performance for steel alloy pipe and nickel-cobalt nanolaminate coated at steel pipe at various D/T ratios versus their collapse pressures along with finite element analysis (FEA) model predictions.

Electrodeposited nanolaminate coatings are provided to improve one or more properties of materials, including tubular materials and in particular tubular materials comprising iron based alloys. Embodiments disclosed herein include the use of nanolaminate coatings comprising nickel and cobalt to improve the properties of tubular items such as those used in oil and gas drilling and production (e.g., goods, such as casings, drill pipe, and the like). Other embodiments of the coated articles comprise tubular materials made from non-metallic materials such as plastics, ceramics, polymeric composites, etc.

2.0 Definitions

"Laminate" or "laminated" as used herein refers to materials that comprise a series of layers, including nanolaminated materials.

"Nanolaminate" or "nanolaminated" as used herein refers to materials or coatings that comprise a series of layers less than 1 micron.

Percentages, unless stated otherwise, are percentage by weight.

3.0 Articles

The articles that can be improved by the coatings of this disclosure include conductive metallic and non-metallic substrates, including especially conductive metallic and non-metallic tubular articles such as those used in oil and gas drilling and production, e.g., goods, casings, drill pipe, and the like, including such products made from steel and also from polymer composite materials such as m-Pipe™, a polymer-carbon fiber composite made from PEEK polymer (produced by Magma).

In embodiments, conductive articles may comprise a conductive or non-conductive polymeric composition and may comprise one or more metals or non-metallic conductive materials added to the polymers (e.g., before or after curing) that render the composition conductive or more conductive. Examples of conductive, non-metallic materials that can be added to polymers to increase conductivity are carbon black, graphene, graphite, carbon nanotubes, carbon nanofibers, or graphite fibers, which can be added to the polymers alone or in combination with conductive metallic materials.

A variety of conductive polymeric materials can thus be used to prepare articles having improved properties according to this disclosure, including tubular articles.

4.0 Nanolaminate Coatings

The composition comprising a metal that is electrodeposited onto the article may vary in its constituent metals. In some embodiments, the composition comprises one or more, two or more, three or more, or four or more different metals independently selected from Ag, Al, Au, Be, Co, Cr, Cu, Fe, Hg, In, Mg, Mn, Mo, Nb, Nd, Ni, Pd, Pt, Re, Rh, Sb, Sn, Mn, Pb, Ta, Ti, W, V, Zn and Zr, wherein each of said independently selected metals is present at greater than 0.1, 0.05, 0.01, 0.005 or 0.001% by weight. In such embodiments, compositions of two or more different metals that can be electrodeposited comprise, for example, Zn and Fe, Zn and Ni, Co and Ni, Ni and Fe, Ni and Cr, Ni and Al, Cu and Zn, or Cu and Sn.

In some embodiments, the composition electrodeposited onto the article comprises a structurally and/or compositionally modulated electrodeposited material or composition. The structurally and/or compositionally modulated composition may comprise at least one portion having a plurality of layers deposited with wavelengths between about 1 nm and about 250 nm, about 1 nm and about 25 nm, about 5 nm and about 50 nm, about 10 nm and about 75 nm, about 1 nm and about 100 nm, about 2 nm and about 200 nm, about 5 nm and about 225 nm, about 10 nm and about 250 nm.

In other embodiments, the structurally and/or compositionally modulated material has at least one portion consisting of a plurality of layers, wherein each of said layers has a thickness in a range selected independently from about 5 nm to about 250 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 nm to about 225 nm, from about 220 nm to about 250 nm, or from about 150 nm to about 250 nm.

Multilayer nanolaminate coatings may comprise a large number of layers. The coatings may comprise two or more, three or more, four or more, six or more, eight or more, ten or more, twenty or more, forty or more, fifty or more, 100 or more, 200 or more, 500 or more, 1,000 or more, 1,500 or more, 2,000 or more, 2,500 or more, 3,000 or more, 3,500 or more, 4,000 or more, 5,000 or more, 6,000 or more, 7,000 or more, or 8,000 or more layers (e.g., first and second layers each counted separately as a layer). The number of layers may be independently selected for each nanolaminate coating present on different portions of an article (e.g., the inside and outside of a pipe may have different coatings applied). The overall number of layers in a coating may also be in a range from about 100 to about 8,000, from about 50 to about 100, from about 100 to about 1,000, from about 1,000 to about 2,000, from about 2,000 to about 4,000, from about 4,000 to about 8,000 layers, or greater than about 8,000 layers.

The overall thickness of the nanolaminate coatings may vary widely depending on the application of the coatings. In some embodiments, the coatings may have a thickness in a range selected independently from 1 micron to 5 cm, from 1 micron to 50 microns, from 50 microns to 100 microns, from 100 microns to 200 microns, from 200 microns to 500 microns, from 500 microns to 800 microns, from 800 microns to 1.2 mm, from 500 microns to 1 mm, from 1 mm to 1.5 mm, from 1.2 mm to 2 mm, from 1.8 mm to 2.5 mm, from 2 mm to 3 mm, from 2.5 mm to 5 mm, from 1 mm to 5 mm, from 5 mm to 1 cm, from 1 cm to 2 cm, or from 2 cm to 5 cm.

As described above, where the electrodeposited material comprises two or more structurally and/or compositionally different layers, the layers may have discrete or diffuse interfaces or combinations of discrete and diffuse interfaces.

In embodiments where the electrodeposited material comprises two or more structurally and/or compositionally different layers, the composition may comprise a plurality of alternating first layers and second layers. The coating of electrodeposited material may consist entirely of the alternating first and second layers, which may have discrete or diffuse interfaces between the layers or. Alternatively, one or more additional layers may be present in the coating between any first and second layer. The first and second layers may be the same throughout or may themselves change in composition and/or structure, and the interfaces (e.g., discrete or diffuse), may change from layer to layer or between groups of layers.

In embodiments described herein, nanolaminate coatings for improving the properties of articles and goods, including those used in oil and gas well drilling and production, may comprise multilayer coatings comprising nickel and cobalt. In some embodiments, a plurality of alternating first layers of nickel or an alloy comprising nickel, and second layers of an alloy comprising nickel and cobalt are combined to form a coated article. Other layers may be included in addition to the first and second layers.

In some embodiments, first layers each may comprise an amount of nickel greater than about 50%, 55%, 60%, 65%, 70%, 75%, 80%, 85%, 90%, 92%, 93%, 94%, 95%, 96%, 97%, 98% or 99%. For all such first layers, the amount of nickel in each layer is independently selected and may be varied from layer to layer or among groups of layers. In some embodiments, each first layer comprises nickel in a range selected independently from 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, and the balance or the substantial part of the balance of the layer may comprise cobalt. In other embodiments, each first layer comprises nickel in a range selected independently from 70%-99%, 70%-75%, 75%-80%, 80%-85%, 85%-90%, 90%-92%, 92%-93%, 93%-94%, 94%-95%, 95%-96%, 96%-97%, 97%-98% or 98%-99%, and the balance or the substantial part of the balance of the layer may comprise cobalt. In still other embodiments, each first layer comprises nickel in a range selected independently from 50%-55%, 55%-60%, 60%-65%, 65%-70%, 70%-75%, 75%-80%, 80%-85% or 85%-90%, and the balance or the substantial part of the balance of the layer may comprise cobalt.

In such embodiments, second layers may each comprise an amount of cobalt in a range independently selected from 5%-35%, 5%-10%, 10%-15%, 15%-20%, 20%-25%, 25%-30% or 30%-35% cobalt. As with the first layers, the amount of cobalt in each second layer is independently selected and may be varied from layer to layer or among groups of layers. In such embodiments each second layer comprises cobalt in a range selected independently from 5%-35%, 5%-10%, 10%-15%, 15%-20%, 20%-25%, 25%-30%, or 30%-35% and the balance or the substantial part of the balance of the layer may comprise nickel. In other embodiments, each second layer comprises cobalt in a range selected independently from 20%-35%, 20%-25%, 25%-30% or 30%-35% and the balance or the substantial part of the balance of the layer may comprise nickel. In yet other embodiments each second layer comprises cobalt in a range selected independently from 5%-20%, 5%-10%, 10%-15% or 15%-20%, and the balance or the substantial part of the balance of the layer may comprise nickel.

In embodiments of this disclosure, each first and/or second layer may comprise, consist essentially of, or consist of nickel and cobalt and insubstantial amounts of other components (e.g., less than 0.1%, 0.05% or 0.01% of other component elements, taken individually). In embodiments of this disclosure, in addition to their nickel and cobalt content, each first and second layer may comprise one or more, two or more, three or more, or four or more additional elements selected independently for each first and second layer from the group consisting of Ag, Al, Au, Be, C, Cr, Cu, Fe, Hg, In, Mg, Mn, Mo, Nb, Nd, P, Pd, Pt, Re, Rh, Sb, Si, Sn, Pb, Ta, Ti, W, V, Zn and Zr. In other such embodiments, in addition to their nickel and cobalt content each first and second layer may comprise one or more, two or more, three or more, or four or more additional elements selected independently for each first and second layer from the group consisting of Ag, Al, C, Cr, Cu, Fe, Mg, Mn, Mo, Nb, P, Sb, Si, Sn, Ti, W, V, Zn and Zr; or from the group consisting of Al, C, Cr, Fe, Mg, Mn, Mo, Si, Sn, Ti, W, V, and Zn. In some embodiments, additional elements that are present will be present at greater than about 0.1% in order not to be considered an insubstantial amount of the component.

As mentioned above, the coating may comprise additional layers in addition to the first and second layers. Such additional layers may comprise any materials as disclosed herein.

In other embodiments where a plurality of first and second layers are present, the first layers may each comprise zinc in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance or substantial part of the balance of which may comprise another element such as iron. In such embodiments, each second layer may comprise iron in a range independently selected from 1%-35%, 1%-3%, 2%-5%, 5%-10%, 10%-15%, 15%-20%, 20%-25%, 25%-30%, or 30%-35%, the balance or substantial part of the balance of which comprises zinc.

In other embodiments where a plurality of first and second layers are present, the first layers each may comprise copper in a range independently selected from 1%-5%, 5%-7%, 7%-10%, 10%-15%, 15%-20%, 20%-30%, 30%-40%, 40%-50%, 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99%, the balance or substantial part of the balance of which may comprise zinc and/or tin. In such embodiments, each second layer comprises zinc and/or tin in a range independently selected from 1%-35%, 1%-3%, 2%-5%, 5%-10%, 10%-15%, 15%-20%, 20%-25%, 25%-30% or 30%-35%, the balance or substantial part of the balance of which comprises copper.

In embodiments where the components of the above-mentioned electrodeposited compositions are not completely defined (that is, less than 100% of the components by weight are defined and/or required), then the balance of those layers may comprise one or more different elements. That is particularly so in embodiments of the above-mentioned binary or ternary alloy compositions comprising a plurality of layers (e.g., of first and second layers). Thus, in some embodiments, the electrodeposited compositions may comprise one or more elements selected from the group consisting of Ag, Al, Au, Be, C, Cr, Cu, Fe, Hg, In, Ir, Mg, Mn, Mo, Nb, Nd, Pd, Pt, Re, Rh, Sb, Si, Sn, Pb, Ta, Ti, W, V, Zn and Zr. In other embodiments, where the electrodeposited composition comprises one or more of said first and/or second layers, the layers may each comprise one or more, two or more, three or more, or four or more elements selected independently for each first and second layer from the group consisting of Ag, Al, Au, Be, C, Cr, Cu, Fe, Hg, In, Mg, Mn, Mo, Nb, Nd, Pd, Pt, Re, Rh, Sb, Si, Sn, Pb, Ta, Ti, W, V, Zn and Zr.

5.0 Nanolaminate Coating Structure and Orientation

Regardless of which nanolaminate coating is employed to improve the properties of an article, the nanolaminate coating composition may be oriented so that a first layer or second layer is in contact with the substrate on which the coating is applied (e.g. the surface of a pipe). Thus in some embodiments a first layer is in contact with the surface on which the electrodeposited coating is applied, and in other embodiments the second coating is in contact with the surface of the substrate. The layer in contact with the surface of the substrate may affect the adhesion of the coating and any corrosion resistance. Because different coatings may be applied to different portions of the same article (e.g., the inside and outside of a pipe or other tube may have different coatings), it will be understood that the different coatings may be oriented differently (i.e., in one coating a first layer contacts a substrate and in a coating applied on a different part of the same article a second layer contacts a substrate).

6.0 Properties of Electrodeposited Coatings and Articles

Electrodeposited alloys applied to articles (e.g., nanolaminate coatings) can be fully or substantially fully dense, having a limited number of pores or cracks, making them useful as corrosion resistant coatings, in addition to their role as a structural component of finished parts or objects.

In embodiments where the electroplated compositions are comprised of a plurality of layers less than about 20 nm (e.g., about 15 nm, 10 nm, 8 nm, or 5 nm), the compositions display increased "Hall-Petch" hardness/toughness and strength. The observed increases in hardness results from grain confinement and increased toughness results from force reflection in the laminate regions. Such coatings tend to follow the Hall-Petch relationship, which traditionally is used to describe the increase in yield strength observed in nanocrystalline materials.

In embodiments where the electroplated compositions are comprised of a plurality of layers of hard and soft materials laminated together, the electrodeposited composition may display Koehler toughening. That form of toughening results from a deflection of a nascent crack at the layer interface due to differing modulus. Such objects can thus absorb the energy that typically causes cracking and thereby prevent or substantially diminish bulk material failure, and/or prolong the time to such bulk material failure.

In addition to mechanical and physical enhancement of article properties, compositions electrodeposited onto articles also can alter the articles' chemical attributes. In some embodiments, at least a portion of the composition electrodeposited onto a article is chemically resistant to the environment and protects the underlying article (e.g., the metal coating protects the article from solvents or UV light that may damage the article). In other embodiments, at least a portion of the composition electrodeposited on the article is more noble than the underlying article and acts as a barrier coating in corrosive environments that can damage the underlying article. In yet other embodiments, at least a portion of the composition electrodeposited on the article is less noble than the article and sacrifices itself in corrosive environments to protect the article.

Where the properties of pipes, tubes and other items having tubular elements are to be improved, the coating thickness may be in the range from less than about 5% to about 25% or more (e.g., from less than 5% to 5%, from about 5% to about 10%, from about 10% to about 15%, from about 15% to about 20%, from about 20% to about 25%, or more than 25%) of the wall thickness of those items. In such ranges, pipes, tubes, and tubular elements can exhibit a marked increase in performance. In some embodiments, pipes or tubes comprised of steel alloys, display a marked improvement their properties, including burst pressure, collapse pressure, or force displacement (crushing force).

Depending on the D/T ratio and thickness and composition of the nanolaminate coating, the burst pressure, collapse pressure and/or force displacement (crushing force) of the externally coated pipe is increased from about 5% up to 100% or more relative to an uncoated pipe having substantially the same composition and substantially the same D/T ratio as the coated pipe. Hence increases in the burst pressure, collapse pressure, or force displacement (crushing force) of about 5 to about 10%, about 10 to about 15%, about 15 to about 20%, about 20 to about 25%, about 25 to about 30%, about 30 to about 35%, about 35 to about 40%, about 40 to about 45%, about 45 to about 50%, about 50 to about 60%, about 60 to about 70%, about 70 to about 80%, about 80 to about 90%, about 90 to about 100% and over 100% can be obtained relative to an uncoated pipe having substantially the same composition and substantially the same D/T ratio as the coated pipe.

6.1 Properties of Nickel-Cobalt or Nickel-Chromium Coated Materials.

In addition to nickel and cobalt containing first and second layers, the coatings may comprise additional layers, such as a coating or nanolaminate coating of NiCr alloys to increase improve the tribological properties and/or chemical resistance of the overall coating.

Improving the properties of articles with nickel-cobalt or nickel-chromium containing nanolaminate coatings can provide the article a variety of desirable properties including, but not limited to, increased hardness, strength, wear resistance, and corrosion resistance.

In one series of embodiments, where pipes, tubes and other items having tubular elements are to be coated, the resulting article can exhibit increases in its collapse and/or burst pressure.

In embodiments where the article is a pipe or tube formed from steel, a steel alloy comprising: carbon, iron, molybdenum, or an alloy comprising carbon, iron, molybdenum and cobalt (such as American Petroleum Institute L80, C95, P110 or Q125 grade steels or American Iron and Steel Institute 4130, 4135, 4137, 4140, or 4145 steels) the nanolaminated nickel-cobalt or nickel-chromium coatings described herein can markedly improve the performance of the tubes and pipes in burst and collapse pressure tests. In embodiments where the nanolaminated nickel-cobalt coatings are applied only to the exterior surface of the pipe and they have a coating thickness from about 5% to about 25% of the wall thickness (e.g., less than 5%, from about 5% to about 10%, from about 10% to about 15%, from about 15% to about 20%, from about 20% to about 25%, or greater than 25% of the wall thickness), the performance exceeds what would be expected from the properties of the separate materials by finite element analysis (FEA) when the data are corrected for changes in the D/T ratio (i.e., the additional thickness of the pipe is included in the measurement). For pipes with typical wall thicknesses in the range of about 0.2 inches to about 0.65 inches, the coating thickness may be from about 10 thousandths to about 160 thousandths of an inch (about 0.25 mm to about 4 mm), but may be either thinner or thicker.

In such embodiments when the D/T ratio is from about 14 to about 15 the burst pressure and/or collapse pressure of the externally coated pipe is increased from about 5% to about 22%, from about 5% to about 10%, from about 10% to about 15% or from about 15% to about 22% relative to an uncoated pipe having substantially the same composition and substantially the same D/T ratio as the coated pipe.

Where the D/T ratio is from about 15 to about 21 the burst pressure and/or collapse pressure of the externally coated pipe is increased from about 10% to about 36%, from about 10% to about 15%, from about 15% to about 20%, from about 20% to about 25%, from about 25% to about 30%, or from about 30% to about 36% relative to an uncoated having substantially the same composition and substantially the same D/T ratio as the coated pipe.

Depending on the D/T ratio and thickness and composition of the nickel-cobalt or nickel-chromium nanolaminate coating, increases in the burst pressure, collapse pressures and/or force displacement (crushing force) of the externally coated pipe is increased from about 5% up to 100% or more the relative to an uncoated having substantially the same composition and substantially the same D/T ratio as the coated pipe. Hence increases in the burst pressure, collapse pressures, or force displacement (crushing force) of about 5 to about 10%, about 10 to about 15%, about 15 to about 20%, about 20 to about 25%, about 25 to about 30%, about 30 to about 35%, about 35 to about 40%, about 40 to about 45%, about 45 to about 50%, about 50 to about 60%, about 60 to about 70%, about 70 to about 80%, about 80 to about 90%, about 90 to about 100% and over 100% can be obtained relative to an uncoated having substantially the same composition and substantially the same D/T ratio as the coated pipe.

In some embodiments a steel pipe having a D/T ratio of about 15 and a nanolaminated nickel-cobalt or nickel-chromium coating on its exterior surface from about 50 to about 70 thousandths of an inch thick has a collapse pressure greater than about 13,000 psi.

In some embodiments a steel pipe having a D/T ratio of about 16 and a nanolaminated nickel-cobalt or nickel-chromium coating on its exterior surface from about 50 to about 70 thousandths of an inch thick has a collapse pressure greater than about 11,000 psi.

In some embodiments a steel pipe having a D/T ratio of about 17 and a nanolaminated nickel-cobalt or nickel-chromium coating on its exterior surface from about 50 to about 70 thousandths of an inch thick has a collapse pressure greater than about 10,500 psi.

In some embodiments a steel pipe having a D/T ratio of about 18 and a nanolaminated nickel-cobalt or nickel-chromium coating on its exterior surface from about 50 to about 70 thousandths of an inch thick has a collapse pressure greater than about 9,750 psi.

In some embodiments a steel pipe having a D/T ratio of about 19 and a nanolaminated nickel-cobalt or nickel-chromium coating on its exterior surface from about 50 to about 70 thousandths of an inch thick has a collapse pressure greater than about 9,000 psi.

The nickel-cobalt or nickel-chromium coatings may also function as corrosion barriers imparting resistance to corrosion of underlying substrates (e.g., susceptible materials such as steels) by acids, bases, $H_2S$ and the like.

7.0 Electrodepositon of Coatings 7.1 Pretreatment of Conductive or Non-Conductive Articles In order to electrodeposit a composition comprising a metal on at least a portion of an article surface that is accessible to liquids, e.g., a tubular article, the surface must be conductive and brought in contact with a bath containing salts of the metals to be electrodeposited. To make the surface of a non-conductive article conductive, or to increase the conductivity of an article that is already conductive, typically requires subjecting the surface to electroless plating of a metal such as nickel, cadmium, gold, silver, rhodium, chrome, zinc, tin, or copper. In some embodiments, the metal applied to the article by electroless deposition is nickel.

Preparation of articles for electroless plating, particularly of non-conductive plastic/polymer articles such as tubular articles, generally includes a step of etching the surface of the article. Etching is typically accomplished by using a strong oxidizing agent to create microscopic pores or holes in the surface of the plastic. The pores or holes increase the surface area and improve adhesion of subsequently applied metal layers. Some strong oxidizing solutions/suspensions used as etchants include peroxides (e.g., hydrogen peroxide), persulfates, chromic acid, acidic or basic permanganate solutions, chromium trioxide solutions or suspensions, and sulfuric acid. In embodiments, the article comprises a tube made from ABS and the etchant is chromic acid or chromium trioxide containing solution/suspension.

Following etching, at least a portion of the etched section of the article may be contacted with a composition that deposits a metallic catalyst on the etched surface of the polymeric article. The catalyst is typically palladium, which can be applied using tin as a reducing agent (e.g., $Sn^{+2}+Pd^{+2}=Sn^{+4}Pd^0$), however, other catalysts including noble metal catalysts may be used (e.g., platinum, rhodium, iridium, nickel, copper, silver, gold). Upon contact with the electroless plating bath, the catalyst causes a layer of metal to form on the surface of the polymeric article exposed to the catalyst and then the bath.

7.2 Electrodeposition

Metals, polymers, and semiconductors can all be electroplated (electrodeposited), and in most cases the required conditions are at or near ambient temperature and pressure. Embodiments of the processes described herein include methods of electrodepositing a composition comprising a metal on an article prepared by additive manufacturing, where the process comprises:

a) optionally subjecting all or part of the article to electroless plating;

b) providing a bath including at least one electrodepositable component;

c) contacting all or part of the article with the bath; and d) applying voltage or current to the article to deposit at least one electrodepositable component comprising a metal.

In some embodiments, the bath comprises at least two, at least three, or at least four electrodepositable components. The electrodepositable components include metal salts, from which metals may be electroplated onto the article, and where the bath comprises more than one metal salt as an electrodepositable component, alloys of varying composition may be electrodeposited on the article depending on the current and voltage applied.

In some embodiments, the method of electrodepositing comprises applying a time varying current density, wherein the time varying current density oscillates at least for two cycles to deposit a structurally and/or compositionally modulated material on the article. The structural and or compositionally modulated material may be applied such that it has a discrete interface, or a diffuse interface, where the composition changes from a first composition to a second composition over a distance from about 3 nm to about 8 nm, about 5 nm to about 10 nm, about 7 nm to about 15 nm or about 10 nm to about 20 nm. In other embodiments, a discrete interface between two layers may be considered as one in which the composition shifts between the compositions of the first layer and the second layer over a distance that is less than about 20%, about 15%, about 10%, about 8%, about 5%, about 4% or about 2% of the thickness of the thinner of the first and second layers. In other embodiments layers have diffuse interfaces where the compositions vary from that of a first composition to a second composition in a continuous manner. In some embodiments, the diffuse interface varies between the compositions of the first and second layer over a distance that is greater than about 20%, about 25%, about 30%, about 35%, about 40% or about 45% or less than or equal to 50% of the thickness of the thinner of the first and second layers.

The composition comprising a metal that is electrodeposited onto the article may vary in its constituent metals. In some embodiments, the composition comprises one or more, two or more, three or more, or four or more different metals independently selected from Ag, Al, Au, Be, Co, Cr, Cu, Fe, Hg, In, Mg, Mn, Mo, Nb, Nd, Ni, Pd, Pt, Re, Rh, Sb, Sn, Mn, Pb, Ta, Ti, W, V, Zn and Zr, wherein each of said independently selected metals is present at greater than 0.1, 0.05, 0.01, 0.005 or 0.001% by weight.

In other embodiments, the composition electrodeposited onto the article comprises two or more or three or more different metals independently selected from Ag, Al, Au, Be, Co, Cr, Cu, Fe, Hg, In, Mg, Mn, Mo, Nb, Nd, Ni, Pd, Pt, Re, Rh, Sb, Sn, Mn, Pb, Ta, Ti, W, V, Zn and Zr, wherein each of said independently selected metals is present at more than 0.1, 0.05, 0.01, 0.005, or 0.001% by weight. In such embodiments, compositions of two or more different metals that can be electrodeposited comprise, for example, Zn and Fe, Zn and Ni, Co and Ni, Ni and Fe, Ni and Cr, Ni and Al, Cu and Zn, or Cu and Sn.

In some embodiments, the composition electrodeposited onto the article comprises a structurally and/or compositionally modulated electrodeposited material or composition. The structurally and/or compositionally modulated composition may comprise at least one portion having a plurality of layers deposited with wavelengths between about 1 nm and about 250 nm, about 1 nm and about 25 nm, about 5 nm and about 50 nm, about 10 nm and about 75 nm, about 1 nm and about 100 nm, about 2 nm and about 200 nm, about 5 nm and about 225 nm or about 10 nm and about 250 nm.

In other embodiments, the structurally and/or compositionally modulated material has at least one portion consisting of a plurality of layers, wherein each of said layers has a thickness in a range selected independently from about 5 nm to about 250 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 nm to about 225 nm, from about 220 nm to about 250 nm or from about 150 nm to about 250 nm.

As described above, where the electrodeposited material comprises two or more structurally and/or compositionally different layers, the layers may have discrete or diffuse interfaces.

In embodiments where the electrodeposited material comprises two or more structurally and/or compositionally different layers, the material may comprise a plurality of alternating first layers and second layers. The coating of electrodeposited material may consist entirely of the alternating first and second layers, which may have discrete or diffuse interfaces between the layers. Alternatively, one or more additional layers may be present in the coating between any first and second layer.

In embodiments where the electrodeposited composition applied to all or part of the article comprises a plurality of layers (e.g., first layers and second layers or alternating first and second layers), the electrodeposited composition applied to the article (e.g., as a conformal coating or partial coating) may comprise two or more, three or more, four or more, six or more, eight or more, ten or more, twenty or more, forty or more, fifty or more, 100 or more, 200 or more, 500 or more, 1,000 or more, 1,500 or more or 2,000 or more alternating first and second layers independently selected for each multilayer coating.

Coatings comprising nickel and cobalt described herein can be applied to the conductive surfaces of articles by electrodeposition as described above. In some embodiments, the electrodeposition of a coating used to improve the properties of an article is carried out in a single bath. Such processes generally comprise the steps of:

a) placing the article in contact with a first electrolyte comprising a salt of nickel, cobalt and optionally comprising any other species of metal to be electrodeposited;

b) applying electric current and varying in time one or more of: the amplitude of the electrical current, electrolyte temperature, electrolyte additive concentration, or electrolyte agitation, in order to produce first and second layers of electrodeposited materials differing in their elemental composition; and c) growing the coating under such conditions until the desired thickness of the coating is achieved.

Nanolaminated nickel-cobalt coatings can also be applied to the conductive surfaces of articles by electrodeposition using serial electrodeposition in two or more baths. Such processes include electrodepositing each first and second layer in separate baths by alternately electrodepositing layers in each bath. Alternatively, nanolaminate layers may be formed by: serially electrodepositing a series of first and second layers from a first electrolyte comprising a salt of nickel, cobalt and any other species of metal to be electrodeposited by varying in time one or more of: the amplitude of the electrical current, electrolyte temperature, electrolyte additive concentration, or electrolyte agitation; followed by serially electrodepositing a series of first and second layers from a second electrolyte comprising a salt of nickel, cobalt and any other species of metal to be electrodeposited by varying in time one or more of: the amplitude of the electrical current, electrolyte temperature, electrolyte additive concentration, or electrolyte agitation.

Accordingly one process employing two different electrolytes for electrodepositing a nanolaminate nickel coating may comprise the steps of:
- a) placing an article in contact with a first electrolyte comprising a salt of nickel or salts of nickel and cobalt, and optionally comprising any other species of metal to be electrodeposited;
- b) applying electric current to electrodeposit a first layer;
- c) contacting the article with a second electrolyte bath comprising a salt of nickel or salts of nickel and cobalt, and optionally comprising any other species of metal to be electrodeposited;
- d) applying electric current to electrodeposit a second layer that is different in composition from said first layer; and
- e) repeating steps (a) through (d) until the desired thickness of the multilayer coating is achieved;

wherein steps (a) through (d) are repeated at least two times.

In other embodiments, a nickel-cobalt coating may be electrodeposited by a process employing two different electrolytes to deposit the nanolaminate coating layers comprising the steps of:
- a) placing an article in contact with a first electrolyte comprising a salt of nickel or salts of nickel and cobalt, and optionally comprising any other species of metal to be electrodeposited;
- b) applying electric current and varying in time one or more of: the amplitude of the electrical current, electrolyte temperature, electrolyte additive concentration, or electrolyte agitation, in order to produce first and second layers of electrodeposited materials differing from each other in their elemental composition and to electrodeposit a first nanolaminate coating;
- c) repeating steps (a) through (b) until the desired thickness of the multilayer coating is achieved;
- d) contacting the article with a second electrolyte bath comprising a salt of nickel or salts of nickel and cobalt, and optionally comprising any other species of metal to be electrodeposited;
- e) applying electric current and varying in time one or more of: the amplitude of the electrical current, electrolyte temperature, electrolyte additive concentration, or electrolyte agitation, in order to produce a second set of first and second layers of electrodeposited materials differing in their elemental composition from each other and to electrodeposit a second nanolaminate coating differing in composition from the nanolaminate coating produced by steps (a) through (c); and
- f) repeating steps (d) through (e) until the desired thickness of a multilayer coating is achieved.

8.0 Certain Embodiments

1. A method of coating an article comprising:
applying to all or part of a surface of said article one or more electrodeposited multilayered coatings comprising a plurality of alternating first layers of nickel or an alloy comprising nickel, and second layers of an alloy comprising nickel and cobalt to form a coated article;
wherein said one or more multilayer coatings comprises from about 50 to about 100, from about 100 to about 1,000, from about 1,000 to about 2,000, from about 2,000 to about 4,000, from about 4,000 to about 8,000 or greater than 8,000 alternating first and second layers independently selected for each multilayer coating;
wherein each of said first layers and each of said second layers have a thickness in a range selected independently from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm or from about 200 to about 250 nm; and
wherein the burst pressure and collapse pressure of said coated article are increased relative to said article or a substantially identical article having the same overall dimensions and composition but uncoated.

2. The method of embodiment 1, wherein said surface is an interior surface or an exterior surface, and wherein for at least one multilayer coating said first layer is in contact with said interior surface or exterior surface.

3. The method of any of embodiments 1-2, wherein said surface is an interior surface or an exterior surface, and wherein for at least one multilayer coating said second layer is in contact with said interior surface or exterior surface.

4. The method of any of embodiments 1-3, wherein each said first layer comprises greater than about 50%, 55%, 60%, 65%, 70%, 75%, 80%, 85%, 90%, 92%, 93%, 94%, 95%, 96%, 97%, 98% or 99% nickel.

5. The method of any of embodiments 1-4, wherein each second layer comprises cobalt in a range independently selected from 5%-35%, 5%-10%, 10%-15%, 15%-20%, 20%-25%, 25%-30%, or 30%-35%.

6. The method of embodiment 4, wherein each first layer comprises nickel in a range selected independently from 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% or 98%-99% and the balance of the layer is cobalt.

7. The method of embodiment 5, wherein each second layer comprises cobalt in a range selected independently from 5%-35%, 5%-10%, 10%-15%, 15%-20%, 20%-25%, 25%-30%, or 30%-35% and the balance of the layer is nickel.

8. The method of any of embodiments 1-5, wherein one or more of said first and/or second layers comprises one or more, two or more, three or more or four or more elements selected independently for each layer of each coating from the group consisting of Ag, Al, Au, Be, C, Cr, Cu, Fe, Hg, In, Mg, Mn, Mo, Nb, Nd, Pd, Pt, Re, Rh, Sb, Si, Sn, Pb, Ta, Ti, W, V, Zn and Zr.

9. The method of any of embodiments 1-8, wherein each of said elements are present at concentrations of 0.01% or greater.

10. The method of any of embodiments 1-8, wherein each of said one or more electrodeposited coatings has a thickness in a range selected independently from 1 micron to 5 cm, from 1 micron to 50 microns, from 50 microns to 100 microns, from 100 microns to 200 microns, from 200 microns to 500 microns, from 500 microns to 800 microns, from 800 microns to 1.2 mm, from 500 microns to 1 mm, from 1 mm to 1.5 mm, from 1.2 mm to 2 mm, from 1.8 mm to 2.5 mm, from 2 mm to 3 mm, from 2.5 mm to 5 mm, from 1 mm to 5 mm, from 5 mm to 1 cm, from 1 cm to 2 cm or from 2 cm to 5 cm.

11. The method of any of embodiments 1-10, wherein said article is formed from a steel alloy comprising: carbon and iron; carbon, iron, molybdenum; or carbon, iron, molybdenum and cobalt.

12. The method of any of embodiments 1-11, wherein said article is a pipe or tube having a composition, comprising a wall, an interior surface, and an exterior surface defining an exterior diameter, and having an exterior diameter/wall thickness (D/T) ratio;

said method further comprising applying the multilayer coating to at least one of the interior and/or exterior surfaces to form a coated pipe;

wherein when the D/T ratio is from about 14 to about 15 the burst pressure and/or collapse pressure of the coated pipe is increased from about 5% to about 22%, from about 5% to about 10%, from about 10% to about 15% or from about 15% to about 22% relative to an uncoated pipe having said composition and substantially the same D/T ratio as the coated pipe; and wherein when the D/T ratio is from about 15 to about 21 the burst pressure and/or collapse pressure of the coated pipe is increased from about 10% to about 36%, from about 10% to about 15%, from about 15% to about 20%, from about 20% to about 25%, from about 25% to about 30% or from about 30% to about 36% relative to an uncoated pipe having said composition and substantially the same D/T ratio as the coated pipe.

13. The method of embodiment 12, wherein the coated pipe has a D/T ratio of about 15, and the collapse pressure is greater than about 13,000 psi.

14. The method of embodiment 12, wherein the coated pipe has a D/T ratio of about 16 and the collapse pressure is greater than about 11,000 psi.

15. The method of embodiment 12, wherein the coated pipe has a D/T ratio of about 17 and the collapse pressure is greater than about 10,500 psi.

16. The method of embodiment 12, wherein the coated pipe has a D/T ratio of about 18 and the collapse pressure is greater than about 9,750 psi.

17. The method of embodiment 12, wherein the coated pipe has a D/T ratio of about 19 and the collapse pressure is greater than about 9,000 psi.

18. The method of embodiment 12, wherein the coated pipe has a D/T ratio of about 20 and the collapse pressure is greater than about 8,600 psi.

19. The method of embodiment 12, wherein the coated pipe has a D/T ratio of about 21 and the collapse pressure is greater than about 8,000 psi.

20. An article prepared by the method of any of embodiments 1-19.

21. A pipe having a substantially cylindrical shape comprising:

a wall comprised of a material having a composition, an interior surface, and an exterior surface;

said pipe having dimensions including a wall thickness, an inner diameter defined by said interior surface, and an exterior diameter defined by said exterior surface;

where at least one of said interior surface and said exterior surface comprises an electrodeposited multilayered coating;

said pipe having a burst pressure and a collapse pressure, wherein said burst pressure and/or collapse pressure of said pipe is greater than the collapse pressure and/or burst pressure of a pipe having substantially the same composition and dimensions in the absence of a coating on its interior or exterior surface.

22. The pipe according to embodiment 21, wherein said multilayered coating comprises a plurality of alternating first layers of nickel or an alloy comprising nickel, and second layers of an alloy comprising nickel and cobalt.

23. The pipe of any of embodiments 21-22, wherein said multilayer coating comprise from about two to about 50, from about 50 to about 100, from about 100 to about 1,000, from about 1,000 to about 2,000, from about 2,000 to about 4,000, from about 4,000 to about 8,000 or greater than 8,000 alternating first and second layers independently selected for each multilayer coating.

24. The pipe of any of embodiments 21-23, wherein said first layers each have a thickness in a range selected independently from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm or from about 200 nm to about 250 nm.

25. The pipe of any of embodiments 21-24, wherein said second layers each have a thickness in a range selected independently from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm or from about 200 nm to about 250 nm.

26. The pipe of any of embodiments 21-25, wherein for at least one of said electrodeposited multilayered coatings said first layer is in contact with said interior surface or said exterior surface.

27. The pipe of any of embodiments 21-25, wherein for at least one of said electrodeposited multilayered coatings said second layer is in contact with said interior surface or said exterior surface.

28. The pipe of any of embodiments 21-27, wherein each first layer comprises nickel in a range independently selected from: 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% and 98%-99%.

29. The pipe of any of embodiments 21-28, wherein each second layer comprises cobalt in a range independently selected from: 5%-35%, 5%-10%, 10%-15%, 15%-20%, 20%-25%, 25%-30%, and 30%-35% cobalt.

30. The pipe of embodiment 28, wherein each first layer comprises nickel in a range independently selected from: 50%-55%, 55%-60%, 60%-65%, 65%-70%, 70%-75%, 75%-80%, 80%-85%, 85%-90%, 90%-92%, 92%-93%, 93%-94%, 94%-95%, 95%-96%, 96%-97%, 97%-98% and 98%-99%; and wherein the balance of the second layer is cobalt.

31. The pipe of embodiment 29, wherein each second layer comprises cobalt in a range selected independently from: 5%-35%, 5%-10%, 10%-15%, 15%-20%, 20%-25%, 25%-30%, or 30%-35%; and wherein the balance of the layer is nickel.

32. The pipe of any of embodiments 21-29, wherein one or more of said first and/or second layers comprises one or more, two or more, three or more or four or more elements selected independently for each layer from the group consisting of Ag, Al, Au, Be, C, Cr, Cu, Fe, Hg, In, Mg, Mn, Mo, Nb, Nd, Pd, Pt, Re, Rh, Sb, Si, Sn, Pb, Ta, Ti, W, V, Zn and Zr.

33. The pipe of embodiment 32, wherein each of said elements is present at a concentration of 0.01% or greater.

34. The pipe of any of embodiments 21-33, comprising from about 50 to about 100, from about 100 to about 1,000, from about 1,000 to about 2,000, from about 2,000 to about 4,000, from about 4,000 to about 8,000, from about 8,000 to about 10,000, or 10,000 or more alternating first and/or second layers.

35. The pipe of any of embodiments 21-35, wherein each said electrodeposited coating on said interior and/or exterior surface has a thickness in a range selected independently from 1 micron to 5 cm, from 1 micron to 50 microns, from 50 microns to 100 microns, from 100 microns to 200 microns, from 200 microns to 500 microns, from 500 microns to 800 microns, from 800 microns to 1.2 mm, from 500 microns to 1 mm, from 1 mm to 1.5 mm, from 1.2 mm to 2 mm, from 1.8 mm to 2.5 mm, from 2 mm to 3 mm, from 2.5 mm to 5 mm, from 1 mm to 5 mm, from 5 mm to 1 cm, from 1 cm to 2 cm or from 2 cm to 5 cm.

The invention claimed is:

1. A method of coating a tubular article comprising:
forming a coated tubular article by applying an electrodeposited multilayered coating to at least a portion of a surface of the tubular article, the electrodeposited multilayered coating comprising a plurality of alternating layers comprising:
first layers comprising a first alloy comprising (i) nickel in a concentration of at least 50%, by weight, and (ii) cobalt; and
second layers comprising a second alloy comprising (i) nickel, and (ii) cobalt in a concentration ranging from 5% to 35% by weight, the second alloy being different than the first alloy;
wherein the tubular article has a composition and comprises a wall, an interior surface, and an exterior surface defining an exterior diameter, the tubular article having an exterior diameter/wall thickness (D/T) ratio;
wherein each of the first layers and each of said second layers independently have a thickness ranging from about 5 nm to about 250 nm; and
wherein a burst pressure and a collapse pressure of the coated tubular article are increased at least 5% relative to the tubular article or a substantially identical article having the same overall dimensions and composition but uncoated.

2. The method of claim 1, wherein one or more of the first layers, the second layers, or both comprises two or more elements selected independently from the group consisting of Ag, Al, Au, Be, C, Cr, Cu, Fe, Hg, In, Mg, Mn, Mo, Nb, Nd, Pd, Pt, Re, Rh, Sb, Si, Sn, Pb, Ta, Ti, W, V, Zn, and Zr.

3. The method of claim 1, wherein the electrodeposited multilayered coating has a thickness in a range from 1 micron to 5 cm.

4. The method of claim 1, wherein the D/T ratio of the coated tubular article is about 21 and the collapse pressure is greater than about 8,000 psi.

5. The method of claim 1, wherein the plurality of alternating layers further comprises third layers that are different than the first layers and the second layers.

6. A coated tubular article comprising:
a wall having a substantially cylindrical shape, the wall comprising a material having a composition, the wall having a wall thickness, an interior surface defining an interior diameter, and an exterior surface defining an exterior diameter; and
an electrodeposited multilayered coating on the interior surface or the exterior surface, the electrodeposited multilayered coating comprising a plurality of alternating layers comprising:
first layers comprising a first alloy comprising (i) nickel in a concentration of at least 50%, by weight, and (ii) cobalt; and
second layers comprising a second alloy comprising (i) nickel, and (ii) cobalt in a concentration ranging from 5% to 35%, by weight, the second alloy being different than the first alloy;
wherein the coated tubular article has a burst pressure and a collapse pressure that is at least 5% greater than the collapse pressure and burst pressure of an uncoated tubular article having substantially the same composition and dimensions in the absence of the electrodeposited multilayered coating on its interior or exterior surface.

7. The coated tubular article of claim 6, wherein the first layers each have a thickness selected independently from about 5 nm to about 250 nm.

8. The coated tubular article of claim 6, wherein the second layers each have a thickness selected independently from about 5 nm to about 250 nm.

9. The coated tubular article of claim 6, wherein one or more of the first layers or the second layers comprises one or more elements selected independently for each layer from the group consisting of Ag, Al, Au, Be, C, Cr, Cu, Fe, Hg, In, Mg, Mn, Mo, Nb, Nd, Pd, Pt, Re, Rh, Sb, Si, Sn, Pb, Ta, Ti, W, V, Zn, and Zr.

10. The coated tubular article of claim 6, wherein the electrodeposited multilayer coating has a thickness in a range from 1 micron to 5 cm.

11. The coated tubular article of claim 6, wherein the coated tubular article has an exterior diameter/wall thickness (D/T) ratio ranging from about 14 to about 15 and the burst pressure or the collapse pressure of the coated tubular article is increased from about 5% to about 22% relative to an uncoated pipe having the composition and substantially the same D/T ratio as the coated tubular article.

12. The coated tubular article of claim 6, wherein the coated tubular article has an exterior diameter/wall thickness (D/T) ratio ranging from about 15 to about 21 and the burst pressure or the collapse pressure of the coated tubular article is increased from about 10% to about 36% relative to an uncoated pipe having the composition and substantially the same D/T ratio as the coated tubular article.

13. The coated tubular article of claim 6, wherein a thickness of the electrodeposited multilayered coating is less than about 25% of the wall thickness.

14. The coated tubular article of claim 6, wherein the burst pressure and the collapse pressure of the coated tubular article is at least 10% greater than the collapse pressure and burst pressure of a pipe having substantially the same composition and dimensions in the absence of the electrodeposited multilayered coating on its interior or exterior surface.

15. The coated tubular article of claim 6, wherein the electrodeposited multilayered coating has a thickness ranging from 1 micron to 50 microns.

16. The coated tubular article of claim 6, wherein the wall comprises a steel alloy.

17. The coated tubular article of claim 6, wherein the electrodeposited multilayered coating is structurally or compositionally modulated.

18. The coated tubular article of claim 6, wherein the material of the wall is a metallic material.

19. The coated tubular article of claim 6, wherein the plurality of alternating layers further comprises third layers that are different than the first layers and the second layers.

* * * * *